United States Patent
Chae et al.

(10) Patent No.: US 11,340,009 B2
(45) Date of Patent: May 24, 2022

(54) METHOD OF MANUFACTURING DEW FORMATION PREVENTING MEMBER AND REFRIGERATOR AND EVAPORATOR HAVING DEW FORMATION PREVENTING MEMBER

(71) Applicants: LG Electronics Inc., Seoul (KR); IUCF-HYU (Industry-University Cooperation Foundation Hanyang University), Seoul (KR)

(72) Inventors: Sunam Chae, Seoul (KR); Kyungseok Kim, Seoul (KR); Dongrip Kim, Seoul (KR); Hanmin Jang, Seoul (KR); Heungsoo Lee, Seoul (KR)

(73) Assignees: LG Electronics Inc., Seoul (KR); (Industry-University Cooperation Foundation Hanyang University), Seoul (KR)

( * ) Notice: Subject to any disclaimer, the term of this patent is extended or adjusted under 35 U.S.C. 154(b) by 0 days.

(21) Appl. No.: 17/067,057

(22) Filed: Oct. 9, 2020

(65) Prior Publication Data
US 2021/0071943 A1 Mar. 11, 2021

Related U.S. Application Data

(62) Division of application No. 16/065,610, filed as application No. PCT/KR2016/015190 on Dec. 23, 2016, now Pat. No. 10,801,774.

(30) Foreign Application Priority Data
Dec. 24, 2015 (KR) .......................... 10-2015-0186200

(51) Int. Cl.
*B05D 5/00* (2006.01)
*B05D 3/02* (2006.01)
(Continued)

(52) U.S. Cl.
CPC ............ *F25D 23/087* (2013.01); *B05D 1/06* (2013.01); *B05D 1/18* (2013.01); *B05D 3/007* (2013.01);
(Continued)

(58) Field of Classification Search
CPC .... C09D 5/03; C09D 5/1681; B05D 2504/00; B05D 2506/15
See application file for complete search history.

(56) References Cited

U.S. PATENT DOCUMENTS 3,971,708 A * 7/1976 Davis ................... C09D 5/4469
  204/472
6,565,966 B2 * 5/2003 Hiraki .................... B32B 15/08
  428/332
(Continued)

FOREIGN PATENT DOCUMENTS

JP    H09249825       9/1997
KR    2019980025591   8/1998
(Continued)

OTHER PUBLICATIONS

International Search Report in International Application No. PCT/KR2016/015190, dated Jun. 1, 2018, 32 pages.

*Primary Examiner* — Michael P Wieczorek
(74) *Attorney, Agent, or Firm* — Fish & Richardson P.C.

(57) ABSTRACT

A method of manufacturing a dew formation preventing member having a super water repellent surface of the present invention comprises the steps of: mixing a particular paint and polytetrafluoroethylene at a predetermined ratio; particulate painting the mixed paint on a substrate surface; and heat treating the particulate painted substrate. A method of manufacturing a dew formation preventing member having a super water repellent surface according to another aspect of the present invention comprises the steps of: immersing a substrate in an electro deposition paint, and applying a direct
(Continued)

current to conduct electro deposition painting; heat treating the substrate that has undergone the electro deposition painting; and plasma treating the surface of the substrate that has undergone the electro deposition painting.

16 Claims, 8 Drawing Sheets

(51) Int. Cl.

| | |
|---|---|
| *B05D 3/14* | (2006.01) |
| *B05D 1/06* | (2006.01) |
| *B05D 1/18* | (2006.01) |
| *B05D 5/08* | (2006.01) |
| *B05D 7/24* | (2006.01) |
| *F25D 23/08* | (2006.01) |
| *F25D 21/04* | (2006.01) |
| *F25D 11/00* | (2006.01) |
| *F25D 17/08* | (2006.01) |
| *F25D 21/08* | (2006.01) |
| *F25D 23/04* | (2006.01) |
| *C09D 5/03* | (2006.01) |
| *C09D 5/16* | (2006.01) |
| *C09D 167/00* | (2006.01) |
| *F25C 5/20* | (2018.01) |
| *B05D 3/00* | (2006.01) |
| *C09D 5/00* | (2006.01) |
| *B05D 5/10* | (2006.01) |

(52) U.S. Cl.
CPC ........... *B05D 3/0209* (2013.01); *B05D 3/148* (2013.01); *B05D 5/00* (2013.01); *B05D 5/083* (2013.01); *B05D 7/24* (2013.01); *C09D 5/03* (2013.01); *C09D 5/1681* (2013.01); *C09D 167/00* (2013.01); *F25C 5/22* (2018.01); *F25D 11/006* (2013.01); *F25D 17/08* (2013.01); *F25D 21/04* (2013.01); *F25D 21/08* (2013.01); *F25D 23/04* (2013.01); *B05D 3/0254* (2013.01); *B05D 5/086* (2013.01); *B05D 5/10* (2013.01); *B05D 2504/00* (2013.01); *B05D 2506/15* (2013.01); *C09D 5/031* (2013.01)

(56) References Cited

U.S. PATENT DOCUMENTS

| | | | |
|---|---|---|---|
| 8,883,264 | B2 | 11/2014 | Yang et al. |
| 9,073,788 | B2 | 7/2015 | Lin et al. |
| 2012/0045954 | A1 | 2/2012 | Bleecher et al. |
| 2015/0010709 | A1 | 1/2015 | Beckford et al. |
| 2016/0200915 | A1 | 7/2016 | Radchenko et al. |

FOREIGN PATENT DOCUMENTS

| | | |
|---|---|---|
| KR | 100353365 | 9/2002 |
| KR | 1020070120860 | 12/2007 |
| KR | 1020070019232 | 11/2012 |
| KR | 1020140097787 | 8/2014 |
| WO | WO200124944 | 4/2001 |
| WO | WO2015023213 | 2/2015 |

* cited by examiner

METHOD OF MANUFACTURING DEW FORMATION PREVENTING MEMBER AND REFRIGERATOR AND EVAPORATOR HAVING DEW FORMATION PREVENTING MEMBER

CROSS-REFERENCE TO RELATED APPLICATIONS

This application is a divisional of U.S. application Ser. No. 16/065,610, filed on Jun. 22, 2018, now allowed, which is a National Stage application under 35 U.S.C. § 371 of International Application No. PCT/KR2016/015190, filed on Dec. 23, 2016, which claims the benefit of Korean Application No. 10-2015-0186200, filed on Dec. 24, 2015. The disclosures of the prior applications are incorporated by reference in their entirety.

TECHNICAL FIELD

The present invention relates to a method of manufacturing a dew formation preventing member and a refrigerator and an evaporator having a dew formation preventing member manufactured in accordance with the method.

BACKGROUND

In general, a refrigerator is an appliance for storing food in a freezing compartment and a refrigerating compartment at a fresh state for a long time. To this end, the refrigerator cools a storage compartment such as the freezing compartment or the refrigerating compartment by using the cool air generated by heat exchange with a refrigerant that circulates a freezing cycle. Therefore, the inside of the storage compartment of the refrigerator is generally maintained at a temperature lower than that of the outside.

The freezing compartment and the refrigerating compartment are provided inside a cabinet constituting a main body of the refrigerator and selectively opened or closed by a freezing compartment door and a refrigerating compartment door. Since a temperature inside the freezing compartment and a temperature inside the refrigerating compartment are lower than that of the external air, dew may be formed near a portion where the door is in contact with the cabinet at the front of the cabinet in accordance with a temperature difference between the inside and the outside of the refrigerator.

To prevent dew from being formed on an external surface of the refrigerator, a heat is provided and heated at a portion where dew is likely to be formed. This heater for preventing dew from being formed is particularly required to prevent dew from being formed on a front surface of a pillar for filling up a gap between two adjacent doors when the two doors are closed in a refrigerator that opens or close one storage compartment by means of the two doors.

In addition to simple refrigerating and freezing functions, as additional function, a dispenser may be provided in the door of the refrigerator to supply cool water, hot water or ice from water supplied from the outside. An ice maker for making ice from water which is supplied may be provided inside the refrigerating compartment or the freezing compartment or in the door of the refrigerating compartment or the freezing compartment.

The dispenser includes an ice maker for making ice, an ice discharge duct connected with the ice maker, outwardly dispensing ice made by the ice maker in accordance with a user's selection, and a duct cap for selectively opening or closing an outlet at a lower end of the ice discharge duct.

Since the duct cap is exposed to the outside, if the duct cap is opened by the user, ice dispensed through the ice discharge duct may be obtained.

The ice maker of the dispenser and the inside of the ice discharge duct are maintained at a temperature below zero to make ice and keep the ice therein. However, since the outside of the duct cap is in contact with the external air, dew is likely to be formed on an inner surface of the duct cap.

To prevent dew from being formed, a heater is provided inside the duct cap to heat the surface of the duct cap, whereby dew is prevented from being formed on the surface of the duct cap.

If a heating wire is used as a dew formation preventing heater, since the heating wire emits heat by being supplied with a power, problems occur in that power consumption is increased and heat generated from the heater is permeated into the refrigerator to increase a temperature of the storage compartment.

Therefore, the dew formation preventing heater is periodically driven for a predetermined time, or is controlled to be driven by measurement of an outer atmospheric temperature only under the condition that dew is formed.

Also, through interworking with an operation of a compressor, the heater may be driven if the operator is being driven, and the heater may not be driven if not so.

However, if the portion where dew is formed has a property that dew is less formed or not formed in view of its surface property, since the amount of dew which is formed may be reduced and the heater is able to be driven for a short time, power consumption may be reduced.

Meanwhile, the evaporator cools the peripheral air by heat exchange with the peripheral air in accordance with evaporation of a refrigerant moving inside a refrigerant pipe. Since the refrigerant pips is very colder than the peripheral temperature, frost is generates in the refrigerant pipe.

Therefore, a defrost heater is provided near the evaporator and performs defrost operation for operating the defrost heater to periodically remove frost.

However, since the operation of the compressor should be stopped during defrost operation, the temperature inside the storage compartment is increased, and power consumption for operating the defrost heater is increased.

Therefore, the evaporator needs to have surface property that dew or frost is less formed on the surface. In this case, the amount of frost which is generated may be reduced remarkably, and therefore an operation rate of the defrost heater may be reduced.

SUMMARY

The present invention is devised to solve the aforementioned problems of the related art, and an object of the present invention is to provide a method of manufacturing a member having a super water repellent or superhydrophilic surface property to be attached to a portion where dew is likely to be formed and to allow dew to be less or little formed.

Another object of the present invention is to provide a refrigerator in which a member having a super water repellent or superhydrophilic surface property is applied to a pillar, an ice discharge duct switching unit of a dispenser, or a front surface of a cabinet and a barrier.

Other object of the present invention is to provide an evaporator in which a member having a super water repellent surface property is applied to a refrigerant pipe.

Technical Solution

To achieve the objects, according to one embodiment of the present invention, a method of manufacturing a dew formation preventing member comprises the steps of mixing a powder paint with polytetrafluorethylene at a predetermined ratio; powder painting the mixed paint on a substrate surface; and heat treating the powder painted substrate.

Preferably, the powder paint and the polytetrafluorethylene are mixed with each other at a ratio of 1:1 to 4:1.

Preferably, the powder paint is an epoxy polyester based thermal hardening powder paint.

Preferably, a constant voltage applied to a powder painting equipment during the powder painting step is 60 kV to 80 kV.

Preferably, the heat treating step includes a primary heat treatment step for heating in a vacuum oven of 170° C. to 190° C. for 25 minutes to 35 minutes; a secondary heat treatment step for heating on a hot plate of 250° C. to 300° C. for 10 minutes to 20 minutes, and a third heat treatment step for heating by using a heating gun of 450° C. to 550° C.

Preferably, the method further comprises the step of ultrasonic cleaning the substrate by using acetone and deionized water before the mixing step.

Preferably, the method further comprises the step of coating a primer on the substrate surface to reinforce adhesion between powder paints after the ultrasonic cleaning step.

Preferably, the primer coating step includes coating the primer by spraying the primer on the substrate surface, and heat treating in a vacuum oven at a temperature of about 100° C. to 140° C.

Preferably, the method further comprises the step of cleaning the heat treated substrate surface using deionized water after the heat treating step.

Preferably, the mixed paint further includes a perfluoroalkoxy enamel powder.

Preferably, the polytetrafluorethylene and the perfluoroalkoxy enamel powder are mixed with each other at a ratio of 1:1 to 1:2.

In another aspect of the present invention, a method of manufacturing a dew formation preventing member comprises the steps of immersing a substrate in an electro deposition paint, and applying a direct current voltage to perform electro deposition painting; heat treating the substrate painted with the electro deposition paint; and plasma treating the surface of the substrate painted with the electro deposition paint.

Preferably, the electro paint includes melamine formaldehyde as an anode electro deposition paint, and includes aromatic polyurethane as a cathode electro deposition paint.

Preferably, the heat treating step performs heating by using a heating gun of 250° C. to 350° C. to harden the electro deposition paint.

Preferably, the plasma treating step etches the surface painted with the electro deposition paint in a vacuum chamber using argon plasma of a radio frequency power of 100 W to 300 W for 5 minutes to 200 minutes.

Preferably, the method further comprises the step of ultrasonic cleaning the substrate using acetone and deionized water before the electro deposition painting step.

Preferably, the method further comprises the step of cleaning the substrate using deionized water after the electro deposition painting step.

Preferably, the method further comprises the step of natural cooling the substrate to reach a room temperature by taking the substrate out of the vacuum chamber after the plasma treating step.

Preferably, the method further comprises the step of cleaning the surface of the substrate painted with electro deposition paint using a nitrogen gun after the natural cooling step.

In still another aspect of the present invention, a refrigerator comprises a cabinet having a storage compartment therein; a first door rotatably provided at one side of the cabinet, opening or closing one side of the storage compartment; a second door rotatably provided at the other side of the cabinet, opening or closing the other side of the storage compartment; a pillar rotatably provided in the second door, sealing a gap between the first door and the second door when the first door and the second door area closed; and a heater provided inside the pillar, heating a front surface of the pillar to prevent dew from being formed, wherein a dew formation preventing member having a super water repellent surface manufactured in accordance with the aforementioned manufacturing method is attached to the front surface of the pillar.

In further still another aspect of the present invention, a refrigerator comprises a cabinet having a storage compartment therein; a first door rotatably provided at one side of the cabinet, opening or closing one side of the storage compartment; a second door rotatably provided at the other side of the cabinet, opening or closing the other side of the storage compartment; a pillar rotatably provided in the second door, sealing a gap between the first door and the second door when the first door and the second door area closed; and a heater provided inside the pillar, heating a front surface of the pillar to prevent dew from being formed, wherein a dew formation preventing member having a superhydrophilic surface manufactured in accordance with the aforementioned manufacturing method is attached to the front surface of the pillar.

In further still another aspect of the present invention, a refrigerator comprises a cabinet having a storage compartment therein; a door in the cabinet, opening or closing the storage compartment; an ice maker provided in the storage compartment or the door; a dispenser provided in the door, selectively providing ice made by the ice maker; an ice discharge duct connected between the ice maker and the dispenser, forming a path where ice moves; a switching unit provided at a lower end of the ice discharge duct, opening or closing the lower end of the ice discharge duct; and a heater provided in the switching unit, heating an outer surface of the switching unit to prevent dew from being formed, wherein a dew formation preventing member having a super water repellent surface manufactured in accordance with the manufacturing method is attached to the outer surface of the switching unit.

In further still another aspect of the present invention, a refrigerator comprises a cabinet having a storage compartment therein; a door in the cabinet, opening or closing the storage compartment; an ice maker provided in the storage compartment or the door; a dispenser provided in the door, selectively providing ice made by the ice maker; an ice discharge duct connected between the ice maker and the dispenser, forming a path where ice moves; a switching unit provided at a lower end of the ice discharge duct, opening or closing the lower end of the ice discharge duct; and a heater provided in the switching unit, heating an outer surface of the switching unit to prevent dew from being formed, wherein a dew formation preventing member having a superhydrophilic surface manufactured in accordance with the aforementioned method is attached to the outer surface of the switching unit.

In further still another aspect of the present invention, a refrigerator comprises a cabinet having a freezing compartment and a refrigerating compartment therein; a barrier for partitioning the freezing compartment and the refrigerating compartment from each other; a freezing compartment door provided at one side of the cabinet, opening or closing the freezing compartment; a refrigerating compartment door provided at the other side of the cabinet, opening or closing the refrigerating compartment; and a heater provided inside the barrier and the cabinet to prevent dew from being formed by heating a front surface of the barrier and a front surface of the cabinet, wherein a dew formation preventing member having a super water repellent surface manufactured in accordance with the aforementioned method is attached to the front surface of the barrier and the front surface of the cabinet.

In further still another aspect of the present invention, a refrigerator comprises a cabinet having a freezing compartment and a refrigerating compartment therein; a barrier for partitioning the freezing compartment and the refrigerating compartment from each other; a freezing compartment door provided at one side of the cabinet, opening or closing the freezing compartment; a refrigerating compartment door provided at the other side of the cabinet, opening or closing the refrigerating compartment; and a heater provided inside the barrier and the cabinet to prevent dew from being formed by heating a front surface of the barrier and a front surface of the cabinet, wherein a dew formation preventing member having a superhydrophilic surface manufactured in accordance with the aforementioned method is attached to the front surface of the barrier and the front surface of the cabinet.

In further still another aspect of the present invention, an evaporator comprises a refrigerant pipe in which a refrigerant moves, provided to be heat exchanged with the air moving near the refrigerant; a pair of holders for fixing the refrigerant pipe; pins provided on an outer surface of the refrigerant pipe, expediting heat exchange; and a defrost heater provided near the refrigerant pipe, performing heating to remove frost generated in the refrigerant pipe and the pins, wherein the refrigerant pipe, the pair of holders, and the pins constitute a dew formation preventing member manufactured in accordance with the aforementioned method.

According to the present invention, a dew formation preventing member may easily be manufactured, which has a super water repellent or superhydrophilic surface property to be applied to a portion where dew is likely to be formed and to allow dew to be little formed.

A dew formation preventing member having a super water repellent or superhydrophilic surface property may be applied to a portion of a refrigerator, where dew is likely to be formed, to prevent dew formation from occurring and remarkably reduce power consumption.

Also, an evaporator which needs a periodical defrost operation due to occurrence of frost is manufactured as a dew formation preventing member, whereby occurrence of frost may be reduced and a defrost operation rate may be reduced to reduce power consumption.

DETAILED DESCRIPTION

Reference will now be made in detail to the preferred embodiments of the present invention, examples of which are illustrated in the accompanying drawings.

Figure 1:
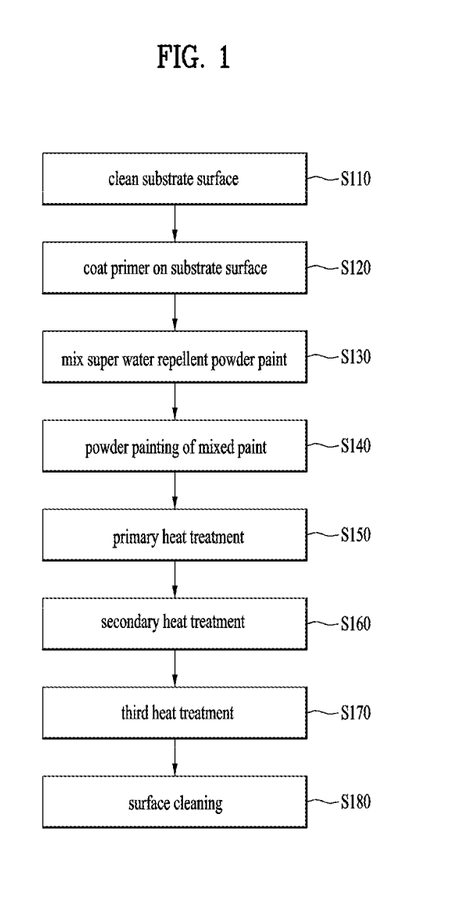
FIG. 1 is a flow chart illustrating a method of manufacturing a dew formation preventing member having a super water repellent surface according to the first embodiment of the present invention.

FIG. 1 is a flow chart illustrating a method of manufacturing a dew formation preventing member having a super water repellent surface according to the first embodiment of the present invention.

A method of manufacturing a dew formation preventing member having a super water repellent surface includes the steps of mixing a powder paint with polytetrafluoroethylene at a predetermined ratio, powder painting the mixed paint on a plate surface; and heat treating the powder painted plate.

The dew formation preventing member of the present invention may be applied to a member where dew is likely to be formed by a temperature difference between the inside and the outside.

A refrigerator may be provided with a freezing compartment and a refrigerating compartment as storage compartments inside a cabinet, wherein the freezing compartment and the refrigerating compartment may be opened or closed by their respective doors.

The cabinet and the doors are provided with insulating materials therein to insulate the inside of the storage compartments from heat, and a gasket is provided at an edge inside the door and closely attached to a front surface of the cabinet to allow the cool air of the storage compartments not to leak out.

Since the inside of the storage compartment of the refrigerator is maintained at a temperature below zero and the outside of the storage compartment is a room temperature, dew is likely to be formed on a portion of the refrigerator, which is close to the storage compartment and adjoins the outer air.

For example, when one storage compartment is opened or closed by two doors, a pillar for selectively sealing a gap between the doors is provided. Since dew may be formed on a front surface of the pillar, a heater is provided inside the pillar and then heated to prevent dew from being formed or evaporate dew.

Also, if a dispenser for providing ice made by an ice maker is provided, since dew may be formed on an inner surface of a switching unit for opening or closing an outlet of an ice discharge path, a heater may be provided inside the switching unit.

Since dew may be formed outside the gasket on the front surface of the cabinet to which the gasket of the door is closely attached and a front surface of a barrier for partitioning the freezing compartment and the refrigerating compartment from each other, a heater may be provided inside the cabinet and the barrier.

The dew formation preventing member is attached to the portion of the refrigerator, where dew is likely to be formed, and then intended that dew is less formed, and its detailed application example will be described later in more detail.

As shown in FIG. 1, a substrate constituting the dew formation preventing member is prepared. The substrate may be formed of a flat plate shape, but may have a specific shape such as a front surface of the pillar or a rear surface of the switching unit.

The substrate is immersed in a cleaning solution, which includes acetone and deionized water, to remove oil and particles that may exist on a surface of the substrate and then is subjected to ultrasonic cleaning for 10 minutes, approximately (S110).

A primer is coated on the surface of the substrate cleaned by ultrasonic cleaning to adhesion with a powder paint (S120).

Most of primers used for a general painting work may be used as the primer, and a main component of the primer is a water soluble material. A synthetic resin and other additive agents are mixed in the primer.

The primer may thinly be coated on the surface of the substrate by a spray jet.

The substrate coated with the primer may be heated at a temperature of 100° C. to 140° C. for 30 minutes and subjected to heat treatment to harden the primer, and then particles on the surface of the substrate are removed.

Next, the powder paint and polytetrafluoroethylene are mixed with each other to form a super water repellent surface (S130).

An epoxy polyester based thermal hardening powder paint may be used as the powder paint, and the powder paint may contain epoxy acrylic polyester as a main component.

The polytetrafluoroethylene is known as a trade name such as Teflon or Fluon, and may be abbreviated as PTFE.

The super water repellency means that a contact angle is 150° or more and a sliding angle is less than 10° when water drop is dropped on the surface of the substrate.

A flat PTFE structure surface has a water repellent property of a contact angle in the range of 110°. If a rough surface is formed while maintaining particle types after PTFE particles are mixed with the powder paint, excellent super water repellent property of a contact angle of 150° or more and a sliding angle less than 10° may be noted.

Preferably, the powder paint and the polytetrafluoroethylene are mixed with each other at a ratio of 1:1 to 4:1.

The PTFE particle has a diameter of 1 μm to 10 μm, and surface roughness may be varied depending on the diameter of the particle. However, a proper mixture ratio of the powder paint and the PTFE is maintained to be substantially the same.

If the powder paint and the PTFE are maintained at a ratio of 4:1, it is noted that a center line average roughness $R_a$ is about 8.45 μm, $R_q$ is 10.67 μm and a contact angle is 158.7°.

If the powder paint and the PTFE are maintained at a ratio of 2:1, it is noted that a center line average roughness $R_a$ is about 8.79 μm, $R_q$ is 11.39 μm and a contact angle is 153.7°. In this case, roughness is more increased than the ratio of 4:1 but a uniform surface is not formed and adhesion of the PTFE particles is lowered if the PTFE is more coated.

On the contrary, if the powder paint and the PTFE are maintained at a ratio of 8:1, it is noted that a center line average roughness $R_a$ is about 7.76 μm, $R_q$ is 10.07 μm and a contact angle is 152.2°. It is noted that roughness is reduced and dew formation preventing performance is reduced if the content of the powder paint is increased.

If the dew formation preventing member has a roughness of 8.00 μm or more and a contact angle is 150° or more, since sufficient dew formation preventing performance may be exerted, it is preferable that the mixture ratio of the powder paint and the PTFE is in the range of 1:1 to 4:1 as described above.

Next, powder painting is performed for the substrate by using the mixture paint by a powder painting equipment (S140).

At this time, it is preferable that an electrostatic voltage applied to the powder painting equipment with respect to the super water repellent mixture paint is 60 kV to 80 kV.

Next, the powder paint is hardened and adhesion is reinforced by heat treatment of the powder painted substrate, and surface roughness is formed to expose super water repellency.

To this end, it is preferable that the heat treatment process is performed through three stages.

The primary heat treatment stage S150 performs heating in a vacuum oven of 170° C. to 190° C. for 25 minutes to 35 minutes. An air gap between the PTFE particles and the powder paint may be reduced as much as possible and the powder paint may be melted and then hardened.

The secondary heat treatment step S160 performs heating on a hot plate of 250° C. to 300° C. for 10 minutes to 20 minutes. Adhesion between the PTFE particles and the powder paint may be reinforced.

The third heat treatment step S170 performs heating by using a heating gun of 450° C. to 550° C. The PTFE particles are softened to reinforce adhesion and form surface roughness.

Finally, the heat treated substrate surface is cleaned using deionized water and particles are removed (S180).

Meanwhile, the mixture paint further includes a perfluoroalkoxy enamel powder. The perfluoroalkoxy may be abbreviated as PFA.

Since durability of the PTFE particles may be insufficient only by heat treatment after mixture of the powder paint and the PTFE, the perfluoroalkoxy enamel powder may be mixed in the PTFE particles to reinforce durability and adhesion of the PTFE particles.

Also, if the powder paint and the PTFE particles are only mixed with each other, since surface roughness is formed, polishing may be reduced and a problem in view of an esthetic aspect may occur. Therefore, the PFA enamel powder is mixed with the powder paint to perform painting, whereby polishing may be given.

A particle diameter of the PFA enamel powder is 10 μm, approximately.

Preferably, the PTFE and the PFA enamel powder are mixed with each other at a ratio of 1:1 to 1:2.

If the PFA enamel powder is too much mixed in the mixture paint, adhesion may be reinforced but relatively low surface roughness is formed by softening of the PFA enamel, whereby a desired super water repellent surface is not formed.

On the contrary, if the PFA enamel powder is too less mixed in the mixture paint, relatively high super water repellent surface is formed but adhesion reinforcing effect of the PFA enamel powder is not sufficient.

For example, if powder painting is performed by a paint obtained by mixing the powder paint, PTFE and PFA at a ratio of 3:1:2, it is noted that a contact angle is 147.2° and a sliding angle is 60°.

If powder painting is performed by a paint obtained by mixing the powder paint, PTFE and PFA at a ratio of 3:1:1, it is noted that a contact angle is 150.4° and a sliding angle is 60°. In this case, it is noted that surface roughness and super water repellency are greater than those of the paint mixed in the range of 3:1:2.

If powder painting is performed by a paint obtained by mixing the powder paint, PTFE and PFA at a ratio of 3:1:3, it is noted that a contact angle is 142.2° and a sliding angle is pinned. In this case, it is noted that adhesion of the PTFE particles is more increased than that of the paint mixed in the range of 3:1:2 but surface roughness and super water repellency are reduced.

Therefore, it is preferable that a mixture ratio of the powder paint, PTFE and PFA is 1~4:1:1~2.

Since the dew formation preventing member manufactured by the aforementioned manufacturing method has a super water repellent surface, the dew formation preventing member is applied to the portion where dew is likely to be formed, whereby dew may be less formed or the heater may be driven for a shorter time to easily evaporate dew.

Also, since the PFA enamel powder is contained in the powder paint and thus the powder paint has a predetermined polishing level, esthetic effect may be given to even the portion which is externally exposed, and the portion has excellent durability.

Next, a method of manufacturing a dew formation preventing member having a super hydrophilic surface according to the second embodiment of the present invention will be described with reference to FIG. 2.

The method of manufacturing a dew formation preventing member having a super hydrophilic surface according to the present invention comprises the steps of immersing a substrate in an electro deposition paint, and applying a direct current to perform electro deposition painting; heat treating the substrate that has undergone the electro deposition painting; and plasma treating the surface of the substrate that has undergone the electro deposition painting.

The superhydrophilic property means that a contact angle is less than 10° when water drop is dropped on the surface.

Figure 2:
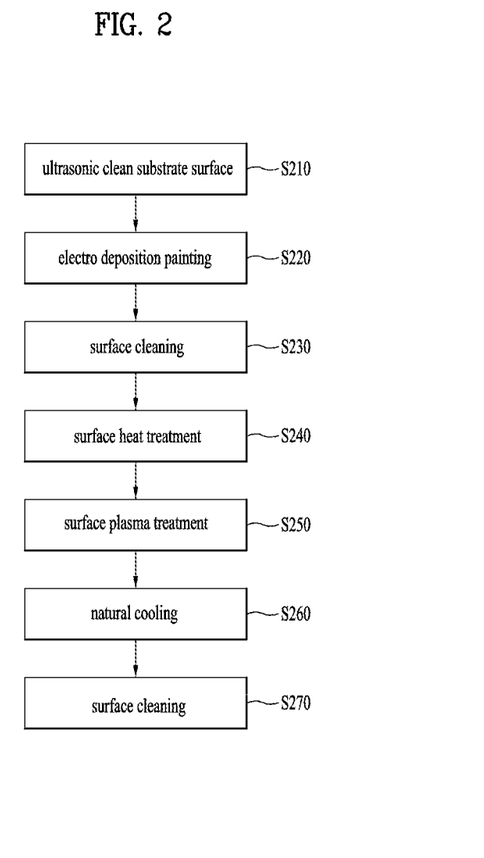
FIG. 2 is a flow chart illustrating a method of manufacturing a dew formation preventing member having a superhydrophilic surface according to the second embodiment of the present invention.

As shown in FIG. 2, a substrate constituting the dew formation preventing member is immersed in a cleaning solution, which includes acetone and deionized water, to remove oil and particles that may exist on a surface of the substrate and then is subjected to ultrasonic cleaning for 10 minutes, approximately (S210).

Next, the cleaned substrate is immersed in an electro deposition paint and a direct current is applied to the substrate to perform electro deposition painting (S220).

The direct current of about 30V may be applied for 10 minutes during the electro deposition painting.

The electro deposition paint may include melamine formaldehyde as an anode electro deposition paint, and may include aromatic polyurethane as a cathode electro deposition paint.

Afterwards, the substrate painted with the electro deposition paint is cleaned using deionized water of a small content to remove particles, thereby forming a smooth painting surface (S230).

Next, the substrate painted with the electro deposition paint is heat treated to harden the electro deposition paint (S240).

The heat treatment step performs heating by using a heating gun of 250° C. to 350° C. to harden the electro deposition paint.

Afterwards, the surface of the substrate painted with the electro deposition paint is plasma treated (S250).

The plasma treatment step may etch the surface painted with the electro deposition paint in a vacuum chamber using an inert gas plasma of a radio frequency power of 100 W to 300 W for 5 minutes to 200 minutes.

The plasma treatment may supply an inert gas such as argon at a flow rate of 30 sccm, construct a plasma inner condition and then etch the surface painted with the electro deposition paint by applying a radio frequency power of 13.56 MHz and 300 W.

In this case, a vacuum pressure is about $8.0 \times 10^{-2}$ Torr, and a distance between the substrate surface and an electrode is about 70 mm.

In this case, it is noted that a center line average roughness $R_a$ of the substrate surface is 508.28 nm and square mean roughness $R_q$ is 699.57 nm to indicate superhydrophilic property. It is also noted that dew of a very small size is formed.

If RF power of 300 W is applied for about 80 minutes, $R_a$ is 455.218 nm and $R_q$ is 602.06 nm and it is noted that surface roughness is reduced.

If RF power of 200 W is applied for about 80 minutes, $R_a$ is 122.03 nm and $R_q$ is 315.55 nm and it is noted that surface roughness is more reduced.

For example, since it is preferable that $R_a$ is 500 nm or more to indicate that the substrate surface has superhydrophilic property, it is preferable that RF power of 300 W or more is applied for 120 minutes or more during electro deposition painting.

However, although the RF power and the plasma operation time may be varied depending on electrode arrangement during plasma treatment process, a power of a plasma treatment equipment, and an environment of a vacuum chamber, it is preferable that a plasma process condition is set such that center line average roughness $R_a$ is 500 nm or more to implement dew formation preventing effect on the superhydrophilic surface.

Next, the plasma treated substrate is taken out of a vacuum chamber and naturally cooled to reach a room temperature (S260).

Finally, the electro deposition painted substrate surface of superhydrophilic property is cleaned using a nitrogen gun to remove particles thereon (S270).

The dew formation preventing member having a superhydrophilic surface, which is manufactured in accordance with the present invention, has a heat transfer area which becomes greater if dew is formed in a film type and the surface has high roughness, dew may easily be evaporated even at a room temperature, and may be removed efficiently even though small heat is supplied to the heater.

Hereinafter, embodiments that the dew formation preventing member manufactured by the aforementioned manufacturing method is applied to the refrigerator will be described.

Figure 3:
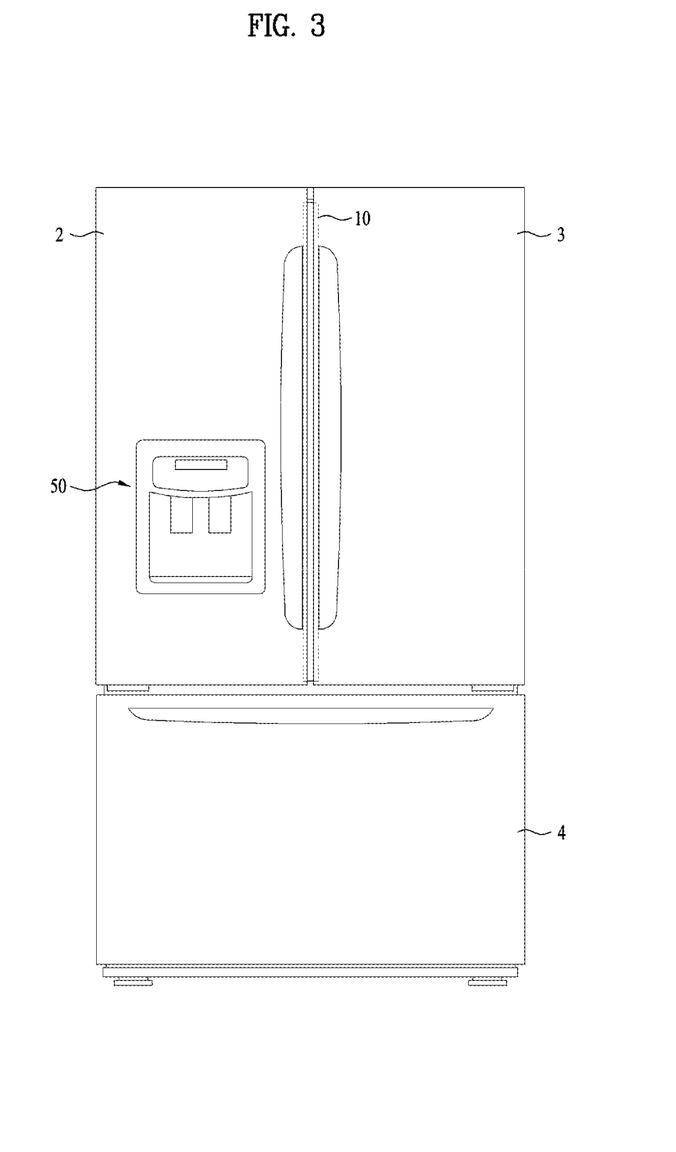
FIG. 3 is a front view illustrating a refrigerator in which a dew formation preventing member according to the present invention is applied to a pillar.

As shown in FIG. 3, the refrigerator according to one embodiment of the present invention is a bottom freezer type refrigerator in which a refrigerating compartment is arranged on a cabinet and a freezing compartment is arranged below the cabinet. Therefore, the refrigerating compartment door is rotatably provided at an upper portion, and in this embodiment, two doors, that is, refrigerating compartment left door 2 and a refrigerating compartment right door 3 are provided to be opened or closed at both sides on the front surface of the refrigerating compartment.

The refrigerating compartment opened or closed by the refrigerating compartment left door 2 and the refrigerating compartment right door 3 may be partitioned into two storage compartments by a barrier (not shown) provided at the center portion in a vertical direction. However, in this embodiment, the barrier is not provided at the center portion of the refrigerating compartment, and the refrigerating compartment is provided to be opened or closed by two doors.

In this way, since two doors 2 and 3 are provided on the front surface of the refrigerating compartment but the barrier is not provided at the center portion of the refrigerating compartment, a pillar 10 for filling a gap between adjacent portions when the left door 2 and the right door 3 are closed.

The pillar 10 may be provided in various shapes, and in this embodiment, the pillar 10 is rotatably provided at a right corner portion of the refrigerating compartment left door 2. When the refrigerating compartment left door 2 is opened, the pillar 10 may backwardly be rotated by cam action at an angle of 90°.

In detail, a cam member (not shown) is provided at an upper end of the pillar 10 to rotate the pillar 10. The cam member is rotated in contact with a pin member provided to be downwardly protruded at the upper end of the center portion of the refrigerating compartment.

As the pin member is rotated in contact with the cam member when the refrigerating compartment left door 2 starts to be opened, the pillar 10 to which the cam member is fixed is also rotated backwardly at an angle of 90°.

Figure 4:
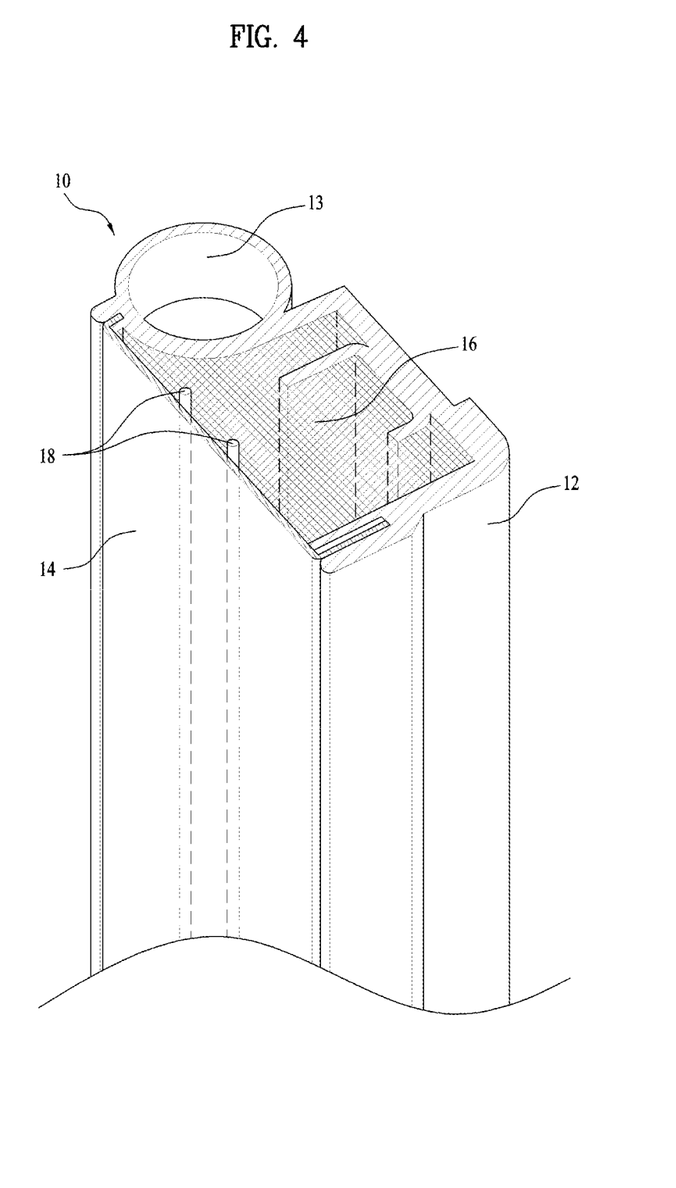
FIG. 4 is a partial cutting perspective view illustrating a pillar in a refrigerator of FIG. 3.

A sectional structure of the pillar 10 according to the embodiment of the present invention is shown in FIG. 4.

As shown, the pillar 10 includes an inner case 12 headed for a rear side of the refrigerating compartment when the refrigerating compartment left door 2 is closed, an outer case 14 coupled with the inner case 12 at the front of the refrigerating compartment, and an insulator 16 filled in the two cases 12 and 14 and foamed.

The pillar 10 may rotatably be provided to the refrigerating compartment left door 2 as a rotary shaft holder portion 13 is coupled thereto.

The outer case 14 of the pillar 10 is partially exposed to the outside of the refrigerator and then in contact with the external air when the refrigerating compartment left door 2 and the refrigerating compartment right door 3 are closed. Therefore, since a temperature inside the refrigerating compartment is lower than a temperature outside the refrigerating compartment when the refrigerator is operated, dew may be formed on the surface of the outer case 14 of the pillar 10.

That is, the pillar 10 is cooled by the air inside the refrigerating compartment cooled at a low temperature, whereas dew is formed on the surface of the outer case 14 of the pillar 10 exposed by the outer air of a relatively high temperature.

To prevent dew from being formed on the outer surface of the pillar 10, a heater 18 made of a heating wire may be provided on an inner side of the outer case 14 of the pillar 10. This heater 18 is provided in such a manner that the insulator 16 is injected into the heater 16 and then foamed in a state that the heater is attached to the inner side of the outer case 14.

The dew formation preventing member having a super water repellent property or a superhydrophilic surface manufactured in accordance with the aforementioned manufacturing method is attached to the front surface of the outer case 14. The outer case 14 may be a substrate of the dew formation preventing member.

Since the front surface of the pillar 10 is formed of a super water repellent surface or a superhydrophilic surface, dew may be less formed than the related art pillar, which is not surface treated, even though the heater 18 is not operated, very small water drop is formed even though dew is formed. Therefore, since the heater 18 may be operated for a short time, power consumption may be reduced remarkably.

Figure 5:
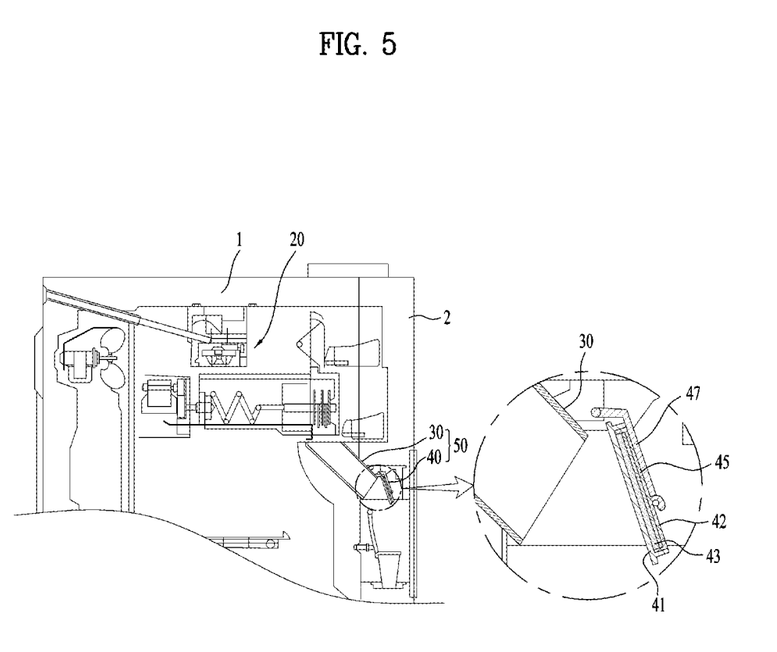
FIG. 5 is a cross-sectional view illustrating a refrigerator in which a dew formation preventing member according to the present invention is applied a switching unit of an ice discharge path.

Next, FIG. 5 is a cross-sectional view illustrating a refrigerator that includes an ice maker and a dispenser provided inside a refrigerating compartment in the refrigerator of FIG. 3.

The refrigerator of the shown embodiment is provided with an ice maker 20 provided inside the refrigerating compartment at an upper portion of the main body 1 in the bottom freezer type refrigerator. The ice maker 20 includes an ice making tray for making ice by being supplied with water and an ice keeping and feeding unit for keeping ice made by the ice making tray and feeding ice as the user operates the dispenser 50.

An ice discharge duct 30 serving as a path for guiding ice to the dispenser 50 provided in the door 2 of the refrigerator is provided below an ice outlet of the ice keeping and feeding unit.

In order that the cool air inside the ice maker 20 does not leak though the ice discharge duct 30 when ice is not discharged through the ice discharge duct 30, the switching unit 40 is rotatably provided at the lower end of the ice discharge duct 30.

The switching unit 40 is provided to block leakage of the cool air, but is selectively provided to be opened or closed because the ice discharge duct 30 should be opened when ice is discharged.

Figure 6:
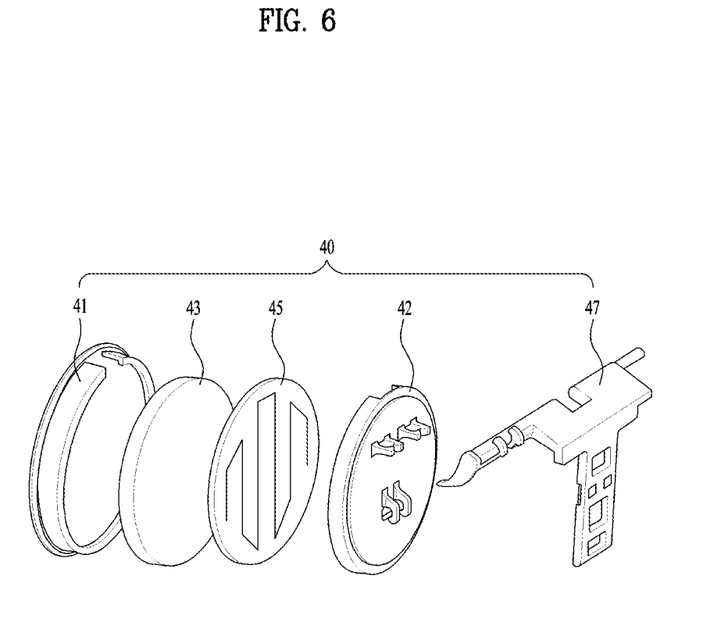
FIG. 6 is an exploded perspective view illustrating a switching unit in a refrigerator of FIG. 5.

As shown in FIGS. 5 and 6, the switching unit 40 includes a main body 41 which is in contact with the lower end of the ice discharge duct 30, a cover 42 coupled with the main body 41, and an insulator 43 filled in a space where the main body 41 and the cover 42 are coupled with each other and formed therein.

Also, a heater 45 for preventing dew from being formed on an outer surface of the cover 42 is provided on the inner surface of the cover 42 of the switching unit 40. Since a temperature of the inner air of the ice discharge duct 30 is lower than that of the outer air to which the cover 42 of the switching unit 40 is exposed, dew may be formed on the surface of the cover 42 exposed to the outer air. The heater 45 may selectively heat the switching unit 40 to prevent dew from being formed.

The heater 45 may be provided in such a manner that a heating wire bent in a predetermined shape is buried in a flat type plate. However, the heater 45 may be provided in another shape without limitation to the shown embodiment.

Also, a lever 47 rotatably provided at an upper portion of the case of the dispenser 50 is coupled to the outer surface of the cover 42. The lever 48 selectively opens the ice discharge duct 30 by rotating the switching unit 40 when the user manipulates the dispenser 50 to discharge ice.

The dew formation preventing member having a super water repellent surface or a superhydrophilic surface manufactured in accordance with the aforementioned manufacturing method is attached to the outer surface of the cover 42. A protrusion formed to be protruded to fix the lever 47 may be formed to the outer surface of the cover 42. In this way, even though the outer surface of the cover 42 is not a flat surface, the cover 42 may be used as the substrate to be coated with a super water repellent surface or a superhydrophilic surface, whereby the cover 42 may be a dew formation preventing member.

Since the outer surface of the cover 42 is formed of a super water repellent surface or a superhydrophilic surface, dew may be less formed than the related art pillar, which is not surface treated, even though the heater 45 is not operated, very small water drop is formed even though dew is formed. Therefore, since the heater 18 may be operated for a short time, power consumption may be reduced remarkably.

Figure 7:
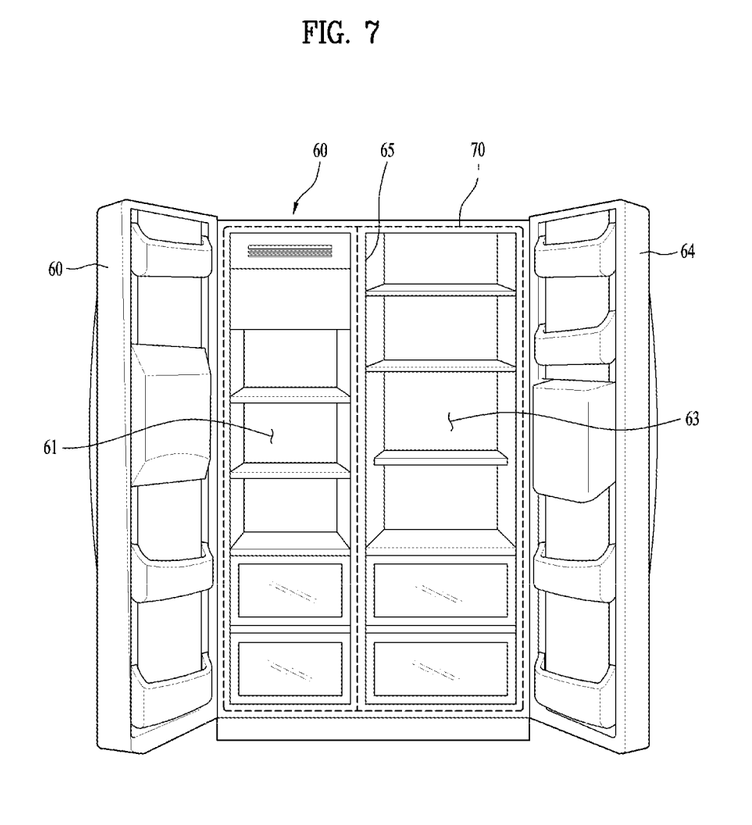
FIG. 7 is a view illustrating a refrigerator in which a dew formation preventing member according to the present invention is applied to a front surface of a barrier and a front surface of a cabinet.

A refrigerator according to another embodiment of the present invention is shown in FIG. 7.

The shown refrigerator is a side by side type refrigerator in which a freezing compartment 61 is provided at a left side of a cabinet 60 and a refrigerating compartment 63 is provided at a right side of the cabinet 60.

The freezing compartment 61 and the refrigerating compartment 63 are partitioned by a barrier 65 provided therebetween. The freezing compartment 61 may be opened or closed by a freezing door compartment 62 which is rotated, and the refrigerating compartment 63 may be opened or closed by a refrigerating compartment door 64.

When the freezing compartment door 62 and the refrigerating compartment door 64 are closed, a gasket of each door is closely attached to a front surface of the cabinet 60 and a front surface of the barrier 65. Dew is likely to be formed on the front surface of the cabinet 60 and the front surface of the barrier 65 toward the outside of the gasket.

Therefore, a heater 70 is provided just behind the front surface of the cabinet 60 and the front surface of the barrier 65 to prevent dew from being formed thereon.

The heater 70 may be a heating wire, or may be a hot pipe of a refrigerant pipe constituting a cooling cycle, wherein a refrigerant of a high temperature moves in the hot pipe.

In this case, the dew formation preventing member having a super water repellent surface or a superhydrophilic surface manufactured in accordance with the aforementioned manufacturing method is attached to the front surface of the cabinet 60 and the front surface of the barrier 65. The front surface of the cabinet 60 and the front surface of the barrier 65 may be the substrate serving as the dew formation preventing member.

Since the front surface of the cabinet 60 and the front surface of the barrier 65 may be the super water repellent surface or the superhydrophilic surface, the amount of dew which is formed may be reduced considerably, and dew may completely be removed even though the heater 70 is operated for a short time.

Figure 8:
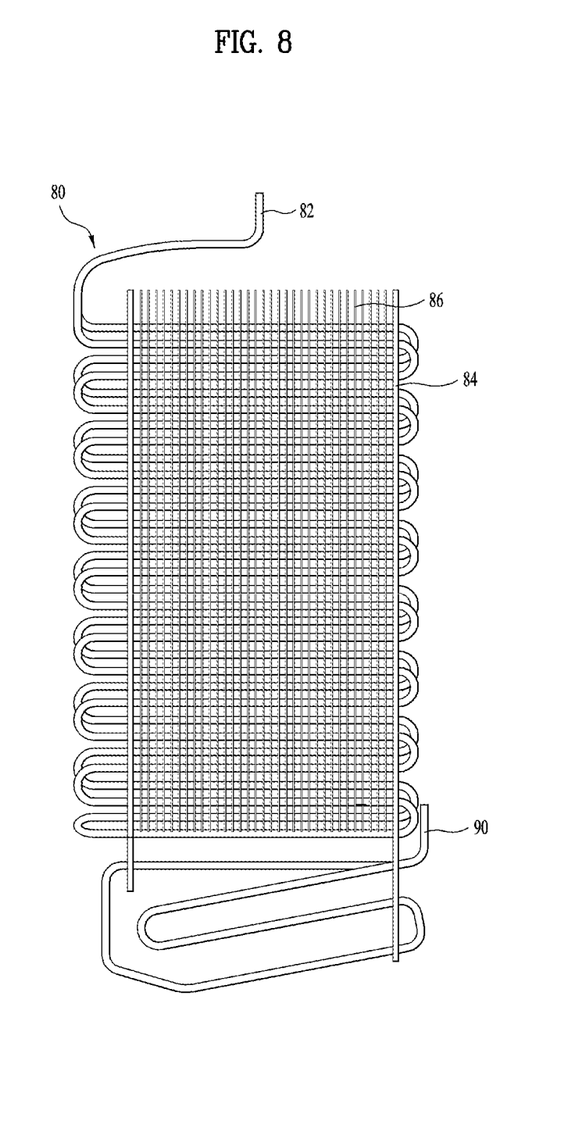
FIG. 8 is a view illustrating an evaporator made of a dew formation preventing member according to the present invention.

An evaporator 80 formed of a dew formation preventing member according to the present invention is shown in FIG. 8.

The evaporator 80 includes a refrigerant pipe 82, in which a refrigerant moves, provided to be heat exchanged with the air moving near the refrigerant, a pair of holders 84 for fixing the refrigerant pipe, pins 86 provided on an outer surface of the refrigerant pipe, expediting heat exchange, and a defrost heater 90 provided near the refrigerant pipe, performing heating to remove frost generated in the refrigerant pipe and the pins.

The refrigerant pipe 82, the pair of holders 84, and the pins 86 may constitute a dew formation preventing member manufactured in accordance with the aforementioned manufacturing method of the present invention.

That is, after the refrigerant pipe 82, the pair of holders 84 and the pins 86 may respectively be manufactured and assembled to form an evaporator 80, powder painting and super water repellent coating such as heat treatment are applied to the evaporator 80 in accordance with the present invention, whereby a super water repellent surface may be formed on the evaporator 80.

According to the evaporator of the present invention, dew is formed on the super water repellent surface of the evaporator 80 and thus the amount of frost generated from the dew may be reduced remarkably, whereby a defrost operation ratio for operating the defrost heater 90 may be reduced remarkably.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for manufacturing a dew formation preventing member, the method comprising:
   electro-deposition painting comprising immersing a substrate in an electro-deposition paint and applying a direct current voltage to the substrate;
   heat treating the substrate painted with the electro-deposition paint; and
   plasma treating a surface of the substrate painted with the electro-deposition paint.

2. The method according to claim 1, wherein electro-deposition painting comprises electro-deposition painting with an anode electro-deposition paint comprising melamine formaldehyde, and a cathode electro-deposition paint comprising aromatic polyurethane.

3. The method according to claim 1, wherein applying the direct current voltage comprises applying the direct current voltage of 30V for 10 minutes.

4. The method according to claim 1, wherein heat treating comprises heating the substrate by a heating gun to harden the electro-deposition paint on the substrate.

5. The method according to claim 4, wherein heat treating comprising heating the substrate to a temperature in a range of 250° C. to 350° C.

6. The method according to claim 1, wherein plasma treating comprises etching the surface of the substrate in a vacuum chamber with an inert gas plasma based on applying a radio frequency power in a range of 100 W to 300 W.

7. The method according to claim 6, wherein etching the surface of the substrate comprises etching the surface of the substrate in the vacuum chamber with argon gas plasma for 5 minutes to 200 minutes.

8. The method according to claim 7, wherein plasma treating comprises plasma treating such that a center line average roughness of the surface of the substrate is greater than or equal to 500 nm after plasma treating.

9. The method according to claim 8, wherein plasma treating comprises etching the surface of the substrate in the vacuum chamber with the radio frequency power of 300 W or more for 120 minutes or more.

10. The method according to claim 1, further comprising ultrasonic cleaning the substrate before electro-deposition painting.

11. The method according to claim 10, wherein ultrasonic cleaning comprises cleaning the substrate with acetone and deionized water.

12. The method according to claim 11, wherein ultrasonic cleaning is performed for 10 minutes.

13. The method according to claim 10, further comprising cleaning the substrate with deionized water after electro-deposition painting.

14. The method according to claim 13, further comprising cooling the substrate to a room temperature based on plasma treating the substrate in a vacuum chamber and taking the substrate out of the vacuum chamber after plasma treating.

15. The method according to claim 14, further comprising cleaning the surface of the substrate painted with electro-deposition paint after cooling the substrate.

16. The method according to claim 15, wherein cleaning the surface of the substrate comprises cleaning the surface of the substrate using a nitrogen gun after cooling the substrate.

* * * * *